United States Patent
McGlaughlin

(10) Patent No.: US 7,542,676 B2
(45) Date of Patent: *Jun. 2, 2009

(54) FIBRE CHANNEL TRANSPARENT SWITCH FOR MIXED SWITCH FABRICS

(75) Inventor: Edward C McGlaughlin, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/031,585

(22) Filed: Feb. 14, 2008

(65) Prior Publication Data

US 2008/0219249 A1  Sep. 11, 2008

Related U.S. Application Data

(63) Continuation of application No. 10/961,463, filed on Oct. 8, 2004, now Pat. No. 7,340,167.

(51) Int. Cl.
*H04J 14/00* (2006.01)
*G06F 15/173* (2006.01)
*G06F 13/00* (2006.01)
*H04L 12/28* (2006.01)

(52) U.S. Cl. .................... 398/45; 709/229; 709/244; 709/245; 710/316; 710/317; 710/240; 370/351; 370/398; 370/401

(58) Field of Classification Search ............. 398/45–54; 370/351–419; 710/2, 240, 316, 317; 702/182; 379/133; 709/229, 244
See application file for complete search history.

(56) References Cited

U.S. PATENT DOCUMENTS

| 4,081,612 A | 3/1978 | Hafner |
| 4,258,418 A | 3/1981 | Heath |
| 4,344,132 A | 8/1982 | Dixon et al. |
| 4,691,296 A | 9/1987 | Struger |

(Continued)

FOREIGN PATENT DOCUMENTS

WO   WO-01/95566   12/2001

OTHER PUBLICATIONS

"PCI Express Base Specification Revision 1.0", (Apr. 29, 2002), 195-196.

(Continued)

*Primary Examiner*—Ken N Vanderpuye
*Assistant Examiner*—Li Liu
(74) *Attorney, Agent, or Firm*—Klein, O'Neill & Singh, LLP

(57) ABSTRACT

A method and a Fibre Channel switch element are provided that allows communication between a host system and a target device attached to a proprietary switch fabric in a network. The Fibre Channel switch element includes a first port that communicates with the target device through the proprietary switch fabric by logging on behalf of the host system so that the proprietary switch behaves as if it was directly communicating with the host system; and a second port that communicates with the host system and collects host bus adapter ("HBA") identification information, wherein the HBA identification information is used to map the first port to the second port so that when the host system communicates with the target device the Fibre Channel switch element is transparent to the proprietary switch fabric.

13 Claims, 11 Drawing Sheets

U.S. PATENT DOCUMENTS

| | | |
|---|---|---|
| 4,716,561 A | 12/1987 | Angell et al. |
| 4,860,193 A | 8/1989 | Bentley et al. |
| 4,964,119 A | 10/1990 | Endo et al. |
| 5,025,370 A | 6/1991 | Koegel et al. |
| 5,090,011 A | 2/1992 | Fukuta et al. |
| 5,258,751 A | 11/1993 | DeLuca et al. |
| 5,260,933 A | 11/1993 | Rouse |
| 5,260,935 A | 11/1993 | Turner |
| 5,280,483 A | 1/1994 | Kamoi et al. |
| 5,291,481 A | 3/1994 | Doshi et al. |
| 5,339,311 A | 8/1994 | Turner |
| 5,390,173 A | 2/1995 | Spinney et al. |
| 5,425,022 A | 6/1995 | Clark et al. |
| 5,537,400 A | 7/1996 | Diaz et al. |
| 5,568,165 A | 10/1996 | Kimura |
| 5,568,167 A | 10/1996 | Galbi et al. |
| 5,579,443 A | 11/1996 | Tatematsu et al. |
| 5,594,672 A | 1/1997 | Hicks |
| 5,677,909 A | 10/1997 | Heide |
| 5,732,206 A | 3/1998 | Mendel |
| 5,757,771 A | 5/1998 | Li et al. |
| 5,764,927 A | 6/1998 | Murphy et al. |
| 5,768,271 A | 6/1998 | Seid et al. |
| 5,768,533 A | 6/1998 | Ran |
| 5,784,358 A | 7/1998 | Smith et al. |
| 5,790,545 A | 8/1998 | Holt et al. |
| 5,790,840 A | 8/1998 | Bulka et al. |
| 5,822,300 A | 10/1998 | Johnson et al. |
| 5,825,748 A | 10/1998 | Barkey et al. |
| 5,828,475 A * | 10/1998 | Bennett et al. ................. 398/52 |
| 5,835,496 A | 11/1998 | Yeung et al. |
| 5,835,748 A | 11/1998 | Orenstein et al. |
| 5,850,386 A | 12/1998 | Anderson et al. |
| 5,892,604 A | 4/1999 | Yamanaka et al. |
| 5,925,119 A | 7/1999 | Maroney |
| 5,936,442 A | 8/1999 | Liu et al. |
| 5,978,379 A | 11/1999 | Chan et al. |
| 6,009,226 A | 12/1999 | Tsuji et al. |
| 6,011,779 A | 1/2000 | Wills |
| 6,031,842 A * | 2/2000 | Trevitt et al. ................. 370/412 |
| 6,046,979 A | 4/2000 | Bauman |
| 6,118,776 A * | 9/2000 | Berman ....................... 370/351 |
| 6,118,791 A | 9/2000 | Fichou et al. |
| 6,134,127 A | 10/2000 | Kirchberg |
| 6,147,976 A | 11/2000 | Shand et al. |
| 6,151,644 A | 11/2000 | Wu |
| 6,158,014 A | 12/2000 | Henson |
| 6,209,089 B1 | 3/2001 | Selitrennikoff et al. |
| 6,230,276 B1 | 5/2001 | Hayden |
| 6,240,096 B1 * | 5/2001 | Book .......................... 370/412 |
| 6,252,891 B1 | 6/2001 | Perches |
| 6,278,708 B1 | 8/2001 | Von Hammerstein et al. |
| 6,286,011 B1 | 9/2001 | Velamuri et al. |
| 6,301,612 B1 | 10/2001 | Selitrennikoff et al. |
| 6,307,857 B1 | 10/2001 | Yokoyama et al. |
| 6,311,204 B1 | 10/2001 | Mills et al. |
| 6,333,932 B1 | 12/2001 | Kobayasi et al. |
| 6,335,935 B2 | 1/2002 | Kadambi et al. |
| 6,397,360 B1 | 5/2002 | Bruns |
| 6,404,749 B1 | 6/2002 | Falk |
| 6,421,342 B1 | 7/2002 | Schwartz et al. |
| 6,438,628 B1 | 8/2002 | Messerly et al. |
| 6,480,500 B1 | 11/2002 | Erimli et al. |
| 6,509,988 B1 | 1/2003 | Saito |
| 6,522,656 B1 | 2/2003 | Gridley |
| 6,563,796 B1 | 5/2003 | Saito |
| 6,570,853 B1 | 5/2003 | Johnson et al. |
| 6,622,206 B1 | 9/2003 | Kanamaru et al. |
| 6,629,161 B2 | 9/2003 | Matsuki et al. |
| 6,643,298 B1 | 11/2003 | Brunheroto et al. |
| 6,657,962 B1 | 12/2003 | Barri et al. |
| 6,684,209 B1 | 1/2004 | Ito et al. |
| 6,697,914 B1 | 2/2004 | Hospodor et al. |
| 6,738,381 B1 | 5/2004 | Agnevik et al. |
| 6,765,871 B1 | 7/2004 | Knobel et al. |
| 6,779,083 B2 | 8/2004 | Ito et al. |
| 6,807,181 B1 * | 10/2004 | Weschler ..................... 370/400 |
| 6,816,492 B1 | 11/2004 | Turner et al. |
| 6,888,831 B1 | 5/2005 | Hospodor et al. |
| 6,901,072 B1 | 5/2005 | Wong |
| 6,904,507 B2 | 6/2005 | Gil |
| 6,922,408 B2 | 7/2005 | Bloch et al. |
| 6,928,470 B1 | 8/2005 | Hamlin |
| 6,934,799 B2 | 8/2005 | Acharya et al. |
| 6,947,393 B2 | 9/2005 | Hooper, III |
| 6,975,627 B1 | 12/2005 | Parry et al. |
| 6,987,768 B1 | 1/2006 | Kojima et al. |
| 6,988,130 B2 | 1/2006 | Blumenau et al. |
| 6,988,149 B2 | 1/2006 | Odenwald |
| 7,024,410 B2 | 4/2006 | Ito et al. |
| 7,031,615 B2 | 4/2006 | Genrile |
| 7,051,182 B2 | 5/2006 | Blumenau et al. |
| 7,061,862 B2 | 6/2006 | Horiguchi et al. |
| 7,076,569 B1 | 7/2006 | Bailey et al. |
| 7,120,728 B2 | 10/2006 | Krakirian et al. |
| 7,123,306 B1 | 10/2006 | Goto et al. |
| 7,150,021 B1 | 12/2006 | Vajjhala et al. |
| 7,155,553 B2 | 12/2006 | Lueck et al. |
| 7,187,688 B2 | 3/2007 | Garmire et al. |
| 7,188,364 B2 | 3/2007 | Volpano |
| 7,190,667 B2 | 3/2007 | Susnow et al. |
| 7,200,610 B1 | 4/2007 | Prawdiuk et al. |
| 7,209,478 B2 | 4/2007 | Rojas et al. |
| 7,230,549 B1 | 6/2007 | Woodral et al. |
| 7,230,929 B2 | 6/2007 | Betker et al. |
| 7,231,560 B2 | 6/2007 | Lai et al. |
| 7,233,570 B2 | 6/2007 | Gregg |
| 7,233,985 B2 | 6/2007 | Hahn et al. |
| 7,245,613 B1 | 7/2007 | Winkles et al. |
| 7,245,627 B2 | 7/2007 | Goldenberg et al. |
| 7,254,206 B2 | 8/2007 | Chiang |
| 7,263,593 B2 | 8/2007 | Honda et al. |
| 7,266,286 B2 | 9/2007 | Tanizawa et al. |
| 7,269,168 B2 | 9/2007 | Roy et al. |
| 7,277,431 B2 | 10/2007 | Walter et al. |
| 7,287,063 B2 | 10/2007 | Baldwin et al. |
| 7,292,593 B1 | 11/2007 | Winkles et al. |
| 7,315,511 B2 | 1/2008 | Morita et al. |
| 7,327,680 B1 | 2/2008 | Kloth |
| 7,346,707 B1 | 3/2008 | Erimli |
| 7,352,740 B2 | 4/2008 | Hammons et al. |
| 7,397,788 B2 | 7/2008 | Mies et al. |
| 7,406,034 B1 | 7/2008 | Cometto et al. |
| 7,443,794 B2 | 10/2008 | George et al. |
| 2001/0022823 A1 | 9/2001 | Renaud |
| 2001/0033552 A1 | 10/2001 | Barrack et al. |
| 2001/0043564 A1 | 11/2001 | Bloch et al. |
| 2002/0016838 A1 | 2/2002 | Geluc et al. |
| 2002/0071387 A1 | 6/2002 | Horiguchi et al. |
| 2002/0103913 A1 * | 8/2002 | Tawil et al. ................. 709/229 |
| 2002/0118692 A1 | 8/2002 | Oberman et al. |
| 2002/0122428 A1 | 9/2002 | Fan et al. |
| 2002/0159385 A1 | 10/2002 | Susnow et al. |
| 2002/0174197 A1 | 11/2002 | Schimke et al. |
| 2002/0191602 A1 * | 12/2002 | Woodring et al. ........... 370/389 |
| 2002/0194294 A1 | 12/2002 | Blumenau et al. |
| 2003/0002516 A1 | 1/2003 | Boock et al. |
| 2003/0033487 A1 | 2/2003 | Pfister et al. |
| 2003/0063567 A1 | 4/2003 | Dehart |
| 2003/0076788 A1 | 4/2003 | Grabauskas et al. |
| 2003/0091062 A1 | 5/2003 | Lay et al. |
| 2003/0093607 A1 | 5/2003 | Main et al. |
| 2003/0112819 A1 | 6/2003 | Kofoed et al. |
| 2003/0115355 A1 | 6/2003 | Cometto et al. |

| | | |
|---|---|---|
| 2003/0118053 A1 | 6/2003 | Edsall et al. |
| 2003/0120743 A1 | 6/2003 | Coatney et al. |
| 2003/0120791 A1 | 6/2003 | Weber et al. |
| 2003/0126223 A1 | 7/2003 | Jenne et al. |
| 2003/0126242 A1 | 7/2003 | Chang |
| 2003/0131105 A1 | 7/2003 | Czeiger et al. |
| 2003/0139900 A1 | 7/2003 | Robison |
| 2003/0161429 A1 | 8/2003 | Chiang |
| 2003/0172149 A1 | 9/2003 | Edsall et al. |
| 2003/0172239 A1 | 9/2003 | Swank |
| 2003/0174652 A1 | 9/2003 | Ebata |
| 2003/0174721 A1 | 9/2003 | Black et al. |
| 2003/0179755 A1 | 9/2003 | Fraser |
| 2003/0189935 A1 | 10/2003 | Warden et al. |
| 2003/0191857 A1 | 10/2003 | Terell et al. |
| 2003/0198238 A1 | 10/2003 | Westby |
| 2003/0200315 A1 | 10/2003 | Goldenberg et al. |
| 2003/0218986 A1 | 11/2003 | DeSanti et al. |
| 2004/0013088 A1 | 1/2004 | Gregg |
| 2004/0013113 A1 | 1/2004 | Singh et al. |
| 2004/0054776 A1 | 3/2004 | Klotz et al. |
| 2004/0054866 A1 | 3/2004 | Blumenau et al. |
| 2004/0064664 A1 | 4/2004 | Gil |
| 2004/0081196 A1 | 4/2004 | Elliott |
| 2004/0085974 A1 | 5/2004 | Mies et al. |
| 2004/0085994 A1 | 5/2004 | Warren et al. |
| 2004/0092278 A1 | 5/2004 | Diepstraten et al. |
| 2004/0141518 A1 | 7/2004 | Milligan et al. |
| 2004/0151188 A1* | 8/2004 | Maveli et al. ............... 370/398 |
| 2004/0153526 A1 | 8/2004 | Haun et al. |
| 2004/0153566 A1 | 8/2004 | Lalsangi et al. |
| 2004/0202189 A1 | 10/2004 | Arndt et al. |
| 2005/0036485 A1 | 2/2005 | Eilers et al. |
| 2005/0036499 A1* | 2/2005 | Dutt et al. .................... 370/401 |
| 2005/0036763 A1 | 2/2005 | Kato et al. |
| 2005/0047334 A1 | 3/2005 | Paul et al. |
| 2005/0073956 A1 | 4/2005 | Moores et al. |
| 2005/0076113 A1 | 4/2005 | Klotz et al. |
| 2005/0088969 A1 | 4/2005 | Carlsen et al. |
| 2005/0108444 A1 | 5/2005 | Flauaus et al. |
| 2005/0111845 A1 | 5/2005 | Nelson et al. |
| 2005/0177641 A1* | 8/2005 | Yamagami .................. 709/229 |
| 2005/0198523 A1* | 9/2005 | Shanbhag et al. ........... 713/200 |
| 2006/0013248 A1 | 1/2006 | Mujeeb et al. |
| 2006/0034192 A1* | 2/2006 | Hurley et al. ............... 370/254 |
| 2006/0034302 A1 | 2/2006 | Peterson |
| 2006/0095607 A1 | 5/2006 | Lim et al. |
| 2006/0107260 A1 | 5/2006 | Motta |
| 2006/0123298 A1 | 6/2006 | Tseng |
| 2006/0143300 A1 | 6/2006 | See et al. |
| 2006/0184711 A1* | 8/2006 | Pettey et al. ................. 710/316 |
| 2006/0203725 A1 | 9/2006 | Paul et al. |
| 2006/0209735 A1 | 9/2006 | Evoy |
| 2006/0253757 A1 | 11/2006 | Brink et al. |
| 2006/0274744 A1 | 12/2006 | Nagai et al. |
| 2007/0011534 A1 | 1/2007 | Boudon et al. |
| 2007/0177701 A1 | 8/2007 | Thanigasalam |
| 2007/0206502 A1 | 9/2007 | Martin et al. |
| 2007/0262891 A1 | 11/2007 | Woodral et al. |

OTHER PUBLICATIONS

"Office Action from USPTO dated Jul. 3, 2007 2007 for U.S. Appl. No. 10/664,548".
"Office Action from USPTO dated Dec. 7, 2007 for U.S. Appl. No. 10/961,463".
"Notice of Allowance from USPTO dated Dec. 21, 2007 for U.S. Appl. No. 10/961,463".
"Notice of Allowance from USPTO dated Dec. 20, 2007 for U.S. Appl. No. 10/889,337".
"Office Action from the USPTO dated Jan. 4, 2008 for U.S. Appl. No. 11/039,189".
"Notice of Allowance from USPTO dated Jan. 8, 2008 for U.S. Appl. No. 10/889,551".
"Office Action from USPTO dated Jan. 9, 2008 for U.S. Appl. No. 10/798,468".
"Office Action from USPTO dated Jan. 9, 2008 for U.S. Appl. No. 11/608,634".
"Notice of Allowance from USPTO dated Jan. 11, 2008 for U.S. Appl. No. 10/664,548".
"Notice of Allowance from USPTO dated Jan. 10, 2008 for U.S. Appl. No. 10/263,858".
"Notice of Allowance from USPTO dated Feb. 8, 2008 for U.S. Appl. No. 10/894,529".
"Office Action from USPTO dated Feb. 12, 2008 for U.S. Appl. No. 11/057,912".
"Office Action from USPTO dated Mar. 5, 2008 for U.S. Appl. No. 10/889,259".
"Office Action from USPTO dated Mar. 7, 2008 for U.S. Appl. No. 10/894,629".
"Office Action from USPTO dated Mar. 20, 2008 for U.S. Appl. No. 10/894,732".
"Final Office Action from USPTO dated Apr. 1, 2008 for U.S. Appl. No. 10/956,717".
"Office Action from USPTO dated Apr. 3, 2008 for U.S. Appl. No. 10/894,587".
"Notice of Allowance from USPTO dated Apr. 4, 2008 for U.S. Appl. No. 11/608,634".
"Office Action from USPTO dated Apr. 4, 2008 for U.S. Appl. No. 10/957,465".
"Notice of Allowance from USPTO dated Apr. 10, 2008 for U.S. Appl. No. 10/241,153".
"Office Action from USPTO dated Apr. 11, 2008 for U.S. Appl. No. 10/894,595".
"Office Action from USPTO dated Apr. 14, 2008 for U.S. Appl. No. 10/894,627".
"Office Action from USPTO dated Apr. 17, 2008 for U.S. Appl. No. 10/894,689".
"Notice of Allowance from USPTO dated Apr. 18, 2008 for U.S. Appl. No. 10/894,597".
"Final Office Action from USPTO dated Apr. 23, 2008 for U.S. Appl. No. 10/889,255".
"Final Office Action from USPTO dated Apr. 25, 2008 for U.S. Appl. No. 10/894,579".
"Final Office Action from USPTO dated Apr. 29, 2008 for U.S. Appl. No. 10/894,491".
"Office Action from USPTO dated May 2, 2008 for U.S. Appl. No. 11/037,922".
"Final Office Action from USPTO dated May 12, 2008 for U.S. Appl. No. 10/894,492".
"Office Action from USPTO dated May 14, 2008 for U.S. Appl. No. 10/956,502".
"Office Action from USPTO dated May 15, 2008 for U.S. Appl. No. 10/798,527".
"Final Office Action from USPTO dated May 21, 2008 for U.S. Appl. No. 10/889,635".
Malavalli et al., "Fibre Channel Framing and Signaling (FC-FS) Rev. 1.10", *NCITS working draft proposed American National Standard for Information Technology*, (Jan. 25, 2001).
"Office Action from USPTO dated Jan. 19, 2006 for U.S. Appl. No. 10/212,425".
"Office Action from USPTO dated Dec. 5, 2006 for U.S. Appl. No. 10/212,425".
"Office Action from USPTO dated May 21, 2007 for U.S. Appl. No. 10/212,425".
"Office Action from USPTO dated Oct. 18, 2006 for U.S. Appl. No. 10/241,153".
"Office Action from USPTO dated Apr. 3, 2007 for U.S. Appl. No. 10/241,153".
"Office Action from USPTO dated Nov. 16, 2007 for U.S. Appl. No. 10/241,153".
"Office Action from USPTO dated Nov. 15, 2006 for U.S. Appl. No. 10/263,858".
"Office Action from USPTO dated Jul. 11, 2007 for U.S. Appl. No. 10/263,858".

"Office Action from USPTO dated Jan. 19, 2007 for U.S. Appl. No. 10/302,149".
"Office Action from USPTO dated Aug. 20, 2007 for U.S. Appl. No. 10/302,149".
"Office Action from USPTO dated Sep. 20, 2007 for U.S. Appl. No. 10/798,527".
"Office Action from USPTO dated Sep. 20, 2007 for U.S. Appl. No. 10/889,267".
"Office Action from USPTO dated Aug. 31, 2007 for U.S. Appl. No. 10/889,635".
"Office Action from USPTO dated Mar. 21, 2006 for U.S. Appl. No. 10/889,588".
"Office Action from USPTO dated Sep. 10, 2007 for U.S. Appl. No. 10/889,255".
"Office Action from USPTO dated Sep. 4, 2007 for U.S. Appl. No. 10/889,551".
"Office Action from USPTO dated Sep. 20, 2007 for U.S. Appl. No. 10/889,259".
"Office Action from USPTO dated Sep. 19, 2007 for U.S. Appl. No. 10/894,492".
"Office Action from USPTO dated Oct. 4, 2007 for U.S. Appl. No. 10/894,627".
"Office Action from USPTO dated Oct. 25, 2007 for U.S. Appl. No. 10/894,491".
"Office Action from USPTO dated Oct. 23, 2007 for U.S. Appl. No. 10/894,597".
"Office Action from USPTO dated Oct. 25, 2007 for U.S. Appl. No. 10/894,579".
"Office Action from USPTO dated Oct. 11, 2007 for U.S. Appl. No. 10/894,629".
"Office Action from USPTO dated Oct. 25, 2007 for U.S. Appl. No. 10/894,536".
"Office Action from USPTO dated Nov. 13, 2007 for U.S. Appl. No. 10/894,586".
"Office Action from USPTO dated Oct. 17, 2007 for U.S. Appl. No. 10/894,917".
"Office Action from USPTO dated Jun. 28, 2007 for U.S. Appl. No. 10/894,529".
"Office Action from USPTO dated Sep. 14, 2007 for U.S. Appl. No. 10/894,978".
"Office Action from USPTO dated Apr. 6, 2007 for U.S. Appl. No. 10/956,718".
"Office Action from USPTO dated Oct. 3, 2007 for U.S. Appl. No. 10/956,717".
"Office Action from USPTO dated Jun. 1, 2007 for U.S. Appl. No. 10/961,463".
"Office Action from USPTO dated Sep. 6, 2007 for U.S. Appl. No. 10/889,337".
"Office Action from USPTO dated Feb. 1, 2007 for U.S. Appl. No. 10/935,919".
"Office Action from USPTO dated Oct. 2, 2007 for U.S. Appl. No. 10/935,919".
"Office Action from USPTO dated Jun. 27, 2008 for U.S. Appl. No. 10/894,726".
"Final Office Action from USPTO dated Jun. 4, 2008 for U.S. Appl. No. 10/894,978".
"Final Office Action from USPTO dated Jun. 5, 2008 for U.S. Appl. No. 10/889,267".
"Final Office Action from USPTO dated Jun. 10, 2008 for U.S. Appl. No. 10/894,586".
"Office Action from USPTO dated Jun. 25, 2008 for U.S. Appl. No. 10/895,175".
"Notice of Allowance from USPTO dated Jun. 25, 2008 for U.S. Appl. No. 10/894,491".
"Notice of Allowance from USPTO dated Jun. 27, 2008 for U.S. Appl. No. 10/956,717".
"Office Action from USPTO dated Jun. 26, 2008 for U.S. Appl. No. 10/894,547".
"Final Office Action from USPTO dated Jul. 9, 2008 for U.S. Appl. No. 10/894,917".
"Notice of Allowance from USPTO dated Jul. 9, 2008 for U.S. Appl. No. 10/894,629".
"Notice of Allowance from USPTO dated Jul. 9, 2008 for U.S. Appl. No. 10/894,579".
"Notice of Allowance from USPTO dated Jul. 17, 2008 for U.S. Appl. No. 10/894,536".
"Office Action from USPTO dated Jul. 25, 2008 for U.S. Appl. No. 10/894,827".
"Final Office Action from USPTO Dated Aug. 4, 2008 for U.S. Appl. No. 10/894,732".
"Notice of Allowance from USPTO dated Aug. 18, 2008 for U.S. Appl. No. 10/889,259".
"Final Office Action from USPTO dated Aug. 20, 2008 for U.S. Appl. No. 10/798,468".
"Office Action from USPTO dated Sep. 18, 2008 for U.S. Appl. No. 10/894,978".
"Notice of Allowance from the USPTO dated Sep. 29, 2008 for U.S. Appl. No. 10/889,267".
"Final Office Action from USPTO dated Oct. 8, 2008 for U.S. Appl. No. 11/057,912".
"Non-Final Office Action from USPTO dated Oct. 10, 2008 for U.S. Appl. No. 10/894,627".
"Notice of Allowance from USPTO dated Oct. 8, 2008 for U.S. Appl. No. 10/889,255".
"Notice of Allowance from USPTO dated Oct. 8, 2008 for U.S. Appl. No. 10/798,527".
"Notice of Allowance from USPTO dated Oct. 15, 2008 for U.S. Appl. No. 10/894,492".
"Final Office Action from USPTO dated Oct. 17, 2008 for U.S. Appl. No. 10/894,595".
"Final Office Action from USPTO dated Nov. 13, 2008 for U.S. Appl. No. 10/894,587".
"Office Action from USPTO dated Nov. 13, 2008 for U.S. Appl. No. 10/894,917".
"Office Action from USPTO dated Nov. 26, 2008 for U.S. Appl. No. 10/956,502".
"Office Action from USPTO dated Nov. 26, 2008 for U.S. Appl. No. 10/894,547".
"Final Office Action from USPTO dated Dec. 24, 2008 for U.S. Appl. No. 10/894,726".
"Office Action from USPTO dated Dec. 23, 2008 for U.S. Appl. No. 10/798,468".
"Notice of Allowance from USPTO dated Dec. 30, 2008 for U.S. Appl. No. 11/037,922".
"Final Office Action from USPTO dated Jan. 21, 2009 for U.S. Appl. No. 10/894,827".
"Office Action from USPTO dated Jan. 17, 2009 for U.S. Appl. No. 10/894,586".
"Final Office Action from USPTO dated Jan. 26, 2009 for U.S. Appl. No. 10/895,175".
"Notice of Allowance from USPTO dated Feb. 10, 2009 for U.S. Appl. No. 10/894,595".
"Office Action from USPTO dated Feb. 17, 2009 for U.S. Appl. No. 10/894,732".
"Notice of Allowance from USPTO dated Feb. 25, 2009 for U.S. Appl. No. 10/894,827".
"Notice of Allowance from USPTO dated Feb. 27, 2009 for U.S. Appl. No. 10/895,175".

* cited by examiner

FIBRE CHANNEL TRANSPARENT SWITCH FOR MIXED SWITCH FABRICS

CROSS REFERENCE TO RELATED APPLICATION

This application is a continuation of U.S. application Ser. No. 10/961,463, filed Oct. 8, 2004 and now granted U.S. Pat. No. 7,340,167, the disclosure of which is incorporated herein by reference in its entirety.

BACKGROUND

1. Field of the Invention

The present invention relates to Fibre Channel networks, and more particularly to a transparent Fibre Channel switch that facilities communication in a Fibre Channel network that includes at least a proprietary Fibre Channel fabric switch.

2. Background of the Invention

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

In Fibre Channel, a path is established between two nodes where the path's primary task is to transport data from one point to another at high speed with low latency, performing only simple error detection in hardware.

Fibre Channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A Fibre Channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port Fibre Channel switch.

Fibre Channel switches use memory buffers to hold frames received and sent across a network. Associated with these buffers are credits, which are the number of frames that a buffer can hold per fabric port.

Storage area networks ("SANs") are commonly used where plural memory storage devices are made available to various host computing systems. Data in a SAN is typically moved from plural host systems (that include computer systems, servers etc.) to a storage system through various controllers/adapters. The Fibre Channel standard is commonly used in SANs today.

FIG. 1A shows an example of a Fibre Channel network. In FIG. 1A, host system 10 is coupled to a standard fabric switch 13. Host system 10 (and/or 10A) typically includes several functional components. These components may include a central processing unit (CPU), main memory, input/output ("I/O") devices (not shown), read only memory, and streaming storage devices (for example, tape drives).

Host systems (for example, 10 and 10A) often communicate with storage systems (for example, devices 15 and 27) via a host bus adapter ("HBA", may also be referred to as a "controller" and/or "adapter") using an interface, for example, a "PCI" or PCI-X bus interface.

FIG. 1A shows four HBAs, 11, 12, 20 and 22. HBA 11 is coupled to switch 13 via port 17, HBA 12 is coupled via port 18, HBA 20 is coupled via port 19 and HBA 22 is coupled via port 21.

Fabric switch 13 is coupled to a proprietary Fibre Channel fabric switch 14 (may also be referred to as "Proprietary Switch 14" or "switch 14") via ports 23 and 16. Fabric switch 13 is also coupled to another proprietary Fibre Channel fabric 26 via ports 24 and 25. Proprietary Switch 14 is coupled to device 15 that may be a storage sub-system, while proprietary fabric switch 26 (may also be referred to as "proprietary switch 26" or "switch 26") is coupled to device 27 which may also be a storage sub-system.

Devices 15 and 27 may be coupled using the Small Computer Systems Interface ("SCSI") protocol and use the SCSI Fibre Channel Protocol ("SCSI FCP") to communicate with other devices/systems. Both the SCSI and SCSI_FCP standard protocols are incorporated herein by reference in their entirety. SCSI FCP is a mapping protocol for applying SCSI command set to Fibre Channel.

Although Fibre Channel is an industry standard, proprietary switches, for example, 14 and 26 are quite common. Such switches often use confidential internal switching technology that allows a host system to communicate with a target device and vice-versa. Often a Fibre Channel network has more than one proprietary switching technology. Brocade Communications Inc® and McData Corporation® are two such corporations that provide such proprietary switching technology.

Proprietary switches have shortcomings. For example, when a proprietary switch (for example, 14) locates/communicates with a non-proprietary switch (for example, fabric switch 13) there is a loss of functionality. This forces SAN builders to use the proprietary switching technology. This loss of functionality becomes sever in mixed vendor environment. For example, in FIG. 1A, use of switch 13 will result in loss of functionality with respect to both switches 14 and 26.

Although standardization is the future of Fibre Channel networks, mixed vendor configurations are a commercial reality. Therefore, there is a need for a Fibre Channel switch that will allow host systems and devices to communicate in a configuration with mixed vendor/proprietary switching technology without any loss of functionality.

SUMMARY OF THE PRESENT INVENTION

A network that allows communication between a proprietary switch fabric and a host system is provided. The network includes a Fibre Channel switch element that is operationally coupled to the host system and to the proprietary switch fabric. The Fibre Channel switch element's presence is transparent to the proprietary switch fabric when the host system communicates with a target device that is coupled to the proprietary switch fabric. The proprietary switch fabric communicates through a port of the Fibre Channel switch element as if it was communicating directly with the host system.

In another aspect of the present invention, a Fibre Channel switch element that allows communication between a host system and a target device that is attached to a proprietary switch fabric is provided. The Fibre Channel switch element includes a first port that communicates with the target device through the proprietary switch fabric by logging on behalf of the host system so that the proprietary switch behaves as if it was directly communicating with the host system.

The Fibre Channel switch element also includes a second port that communicates with the host system and collects HBA identification information, wherein the identification information is used to map the first port to the second port so that when the host system communicates with the target device the Fibre Channel switch element is transparent to the proprietary switch fabric. HBA identification information is collected during a FLOGI process of the second port. Also, the Fibre Channel switch element initiates a FLOGI procedure on behalf of the host system.

In yet another aspect of the present Invention, a method of communication between a host system and a target device that is attached to a proprietary switch fabric is provided. The method includes, collecting a HBA's identification information during a FLOGI process of a first port that couples the host system to a Fibre Channel switch element; and initiating a FLOGI procedure across a second port that couples the proprietary switch fabric to the Fibre Channel switch element, wherein the Fibre Channel switch element initiates the FLOGI on behalf of the host system and the second port records a FC_ID that is received from the proprietary switch fabric.

The Fibre Channel switch element maps the first port to the second port allowing communication between the host system and the target device, wherein the Fibre Channel switch element is transparent to the proprietary switch fabric.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Figure 1A:
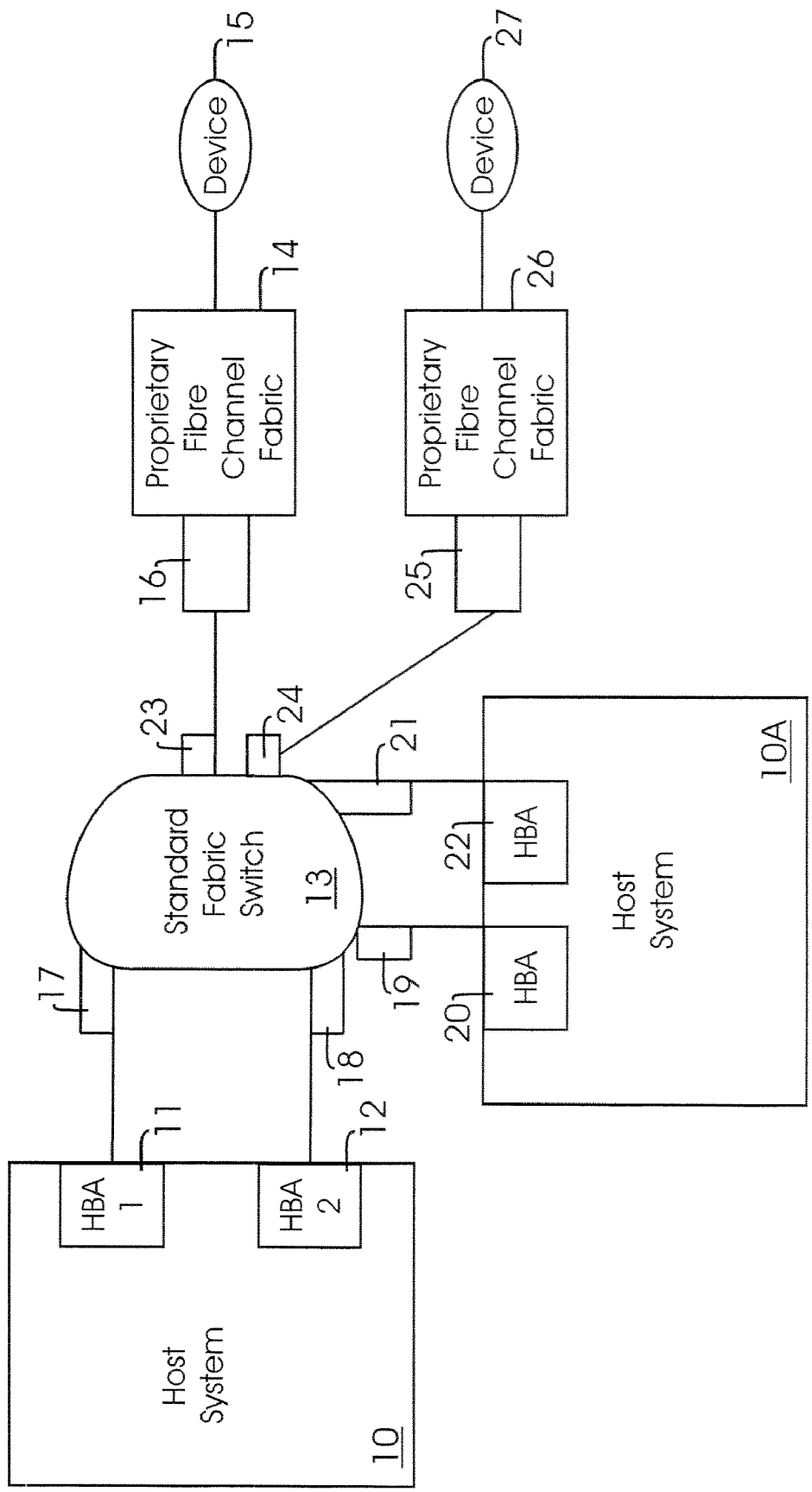
FIG. 1A shows an example of a Fibre Channel network.

Definitions:

The following definitions are provided as they are typically (but not exclusively) used in the Fibre Channel environment, implementing the various adaptive aspects of the present invention.

"ALPA": Aribitrated Loop Physical Address as defined by the Fibre Channel Standards.

"D_ID": A 24-bit Fibre Channel header that contains the destination address for a frame.

"E_Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices (NL_Port, N_ports etc.).

"Fabric Topology": This is a topology where a device is directly attached to a Fibre Channel fabric that uses destination identifiers embedded in frame headers to route frames through a Fibre Channel fabric to a desired destination.

"FC_ID": A generic Fibre Channel address identifier, for example, the D_ID and S_ID.

"FLOGI": Before a Fibre Channel port can send data, the port determines information regarding its operating environment. This includes factors like interconnect topology; other ports in the environment; classes of Service and error recovery services that may be available. To determine this information, a port performs a login procedure. The login procedure includes Fabric Login ("FLOGI") and N_Port Login ("PLOGI, defined below). The Port requesting FLOGI sends Extended Link Service Commands, which includes a Sequence in its own Exchange with a header and Payload format. A recipient of the FLOGI accepts the login by sending an accept ("ACC") command. The format for FLOGI is defined by the Fibre Channel standards.

"Initiator": A device that initiates an input/output ("IO" or "I/O") operation, for example, a HBA.

"L_Port": A port that contains Arbitrated Loop functions associated with the Arbitrated Loop topology.

"OX_ID": An Originator (i.e., a device/port that originates an exchange) Exchange identification field in a Fibre Channel frame header.

"Name Server": Fibre Channel Generic Services (FC-GS-3) specification describes in section 5.0 various Fibre Channel services that are provided by Fibre Channel switches including using a Name Server to discover Fibre Channel devices coupled to a fabric. A Name server provides a way for N_Ports and NL_Ports to register and discover Fibre Channel attributes. Request for Name server commands are carried over the Common Transport protocol, also defined by FC-GS-3. The Name Server information is distributed among fabric elements and is made available to N_Ports and NL_Ports after the ports have logged in. Various commands are used by the Name Server protocol, as defined by FC-GS-3, for registration, de-registration and queries. Fiber Channel Switched Fabric (FC-SW-2) specification describes how a Fabric consisting of multiple switches implements a distributed Name Server.

"N-Port": A direct fabric attached port, for example, a disk drive or a HBA.

"NL_Port": A L_Port that can perform the function of a N_Port.

"PLOGI": Standard Fibre Channel N_Port to N_Port login. The N_Port login is performed after the FLOGI. FLOGI determines the N_port to N_Port parameters and provides a specific set of operating parameters for communicating between N_ports. The port requesting PLOGI sends a PLOGI Extended Link Service Request addressed to the D_ID of an N_Port with which it needs to communicate. The addressed N_Port then returns an ACC reply. The request and reply contain operating parameters for communication between the N_Ports. The format for the request and reply are provided by the Fibre Channel standards.

"Port": A general reference to N. Sub.—Port or F.Sub.—Port.

"SAN": Storage Area Network

"SCSI FCP": A standard protocol, incorporated herein by reference in its entirety for implementing SCSI on a Fibre Channel SAN.

"S_ID": A 24-bit field in a Fibre Channel frame header that contains the source address for a frame.

"Switch": A fabric element conforming to the Fibre Channel Switch standards.

"Target": A device that accepts IO operations from Initiators, for example, storage devices such as disks and tape drives.

Fibre Channel System:

To facilitate an understanding of the preferred embodiment, the general architecture and operation of a Fibre Channel system will be described. The specific architecture and operation of the preferred embodiment will then be described with reference to the general architecture of the Fibre Channel system.

Figure 1B:
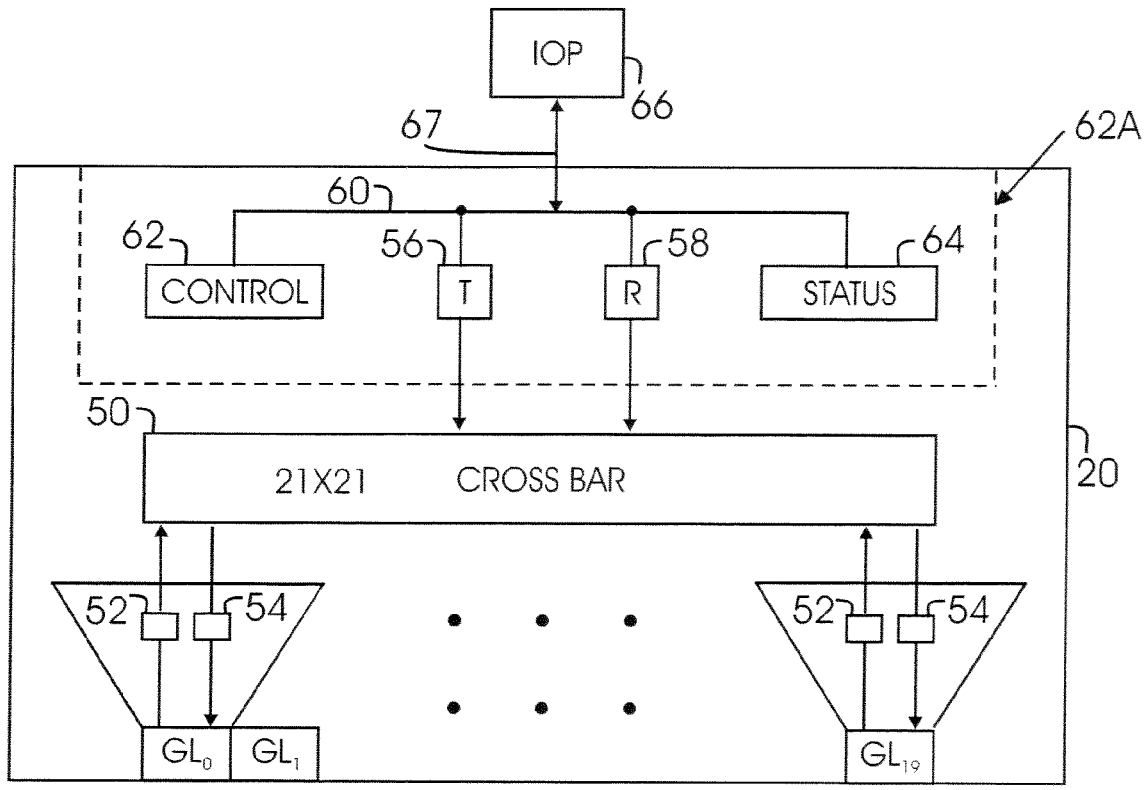
FIG. 1B shows an example of a Fibre Channel switch element, according to one aspect of the present invention.
Figure 1C:
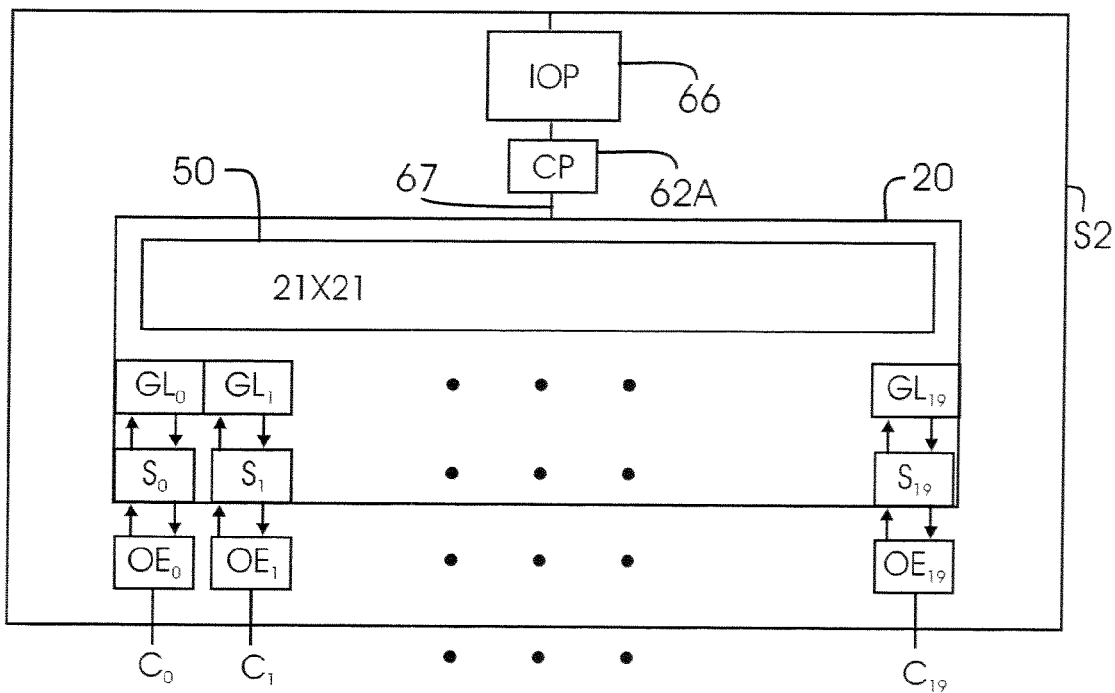
FIG. 1C shows a block diagram of a 20-channel switch chassis, according to one aspect of the present invention.
Figure 1D:
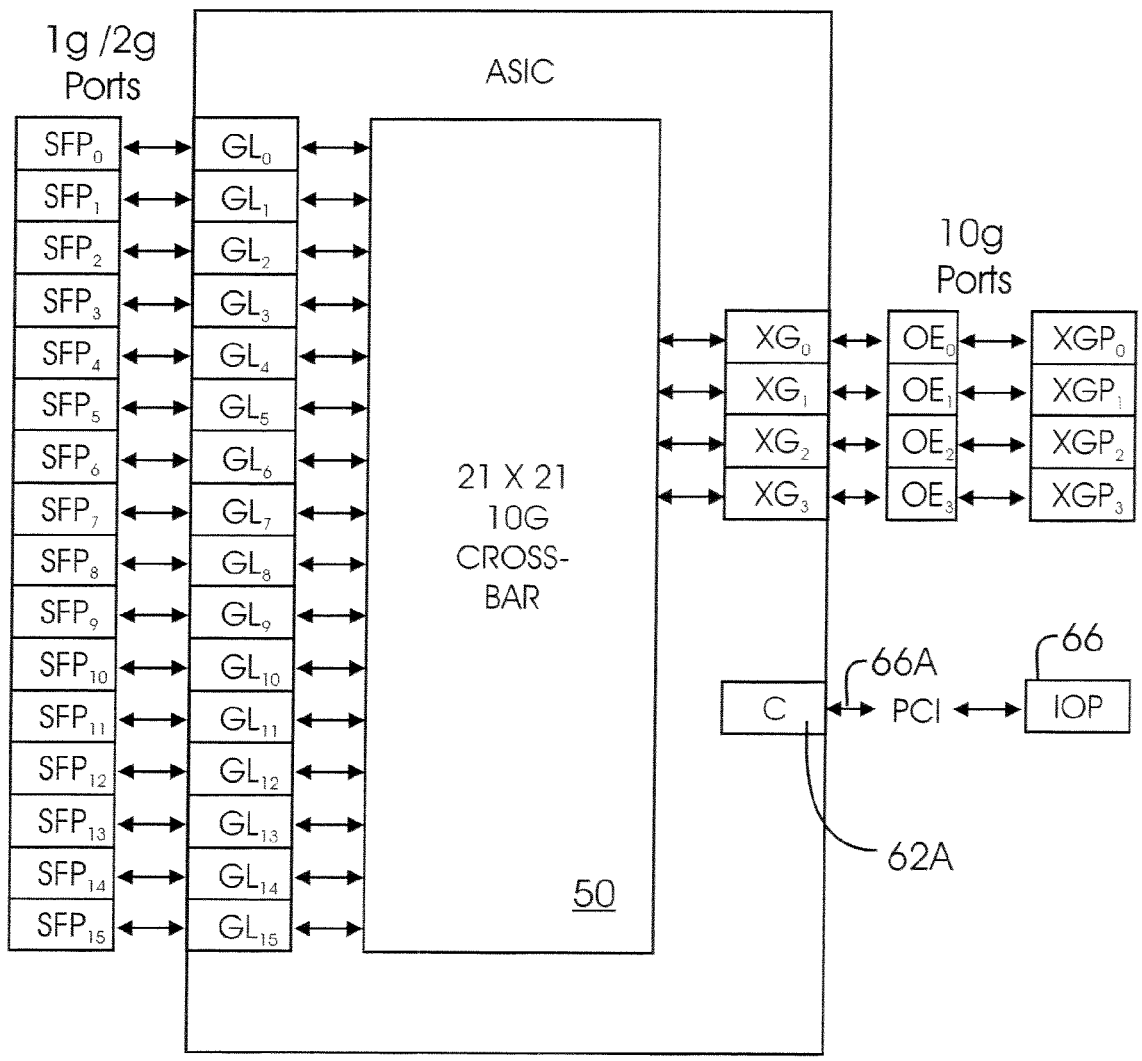
FIG. 1D shows a block diagram of a Fibre Channel switch element with sixteen GL_Ports and four 10 G ports, according to one aspect of the present invention.
Figure 1E:
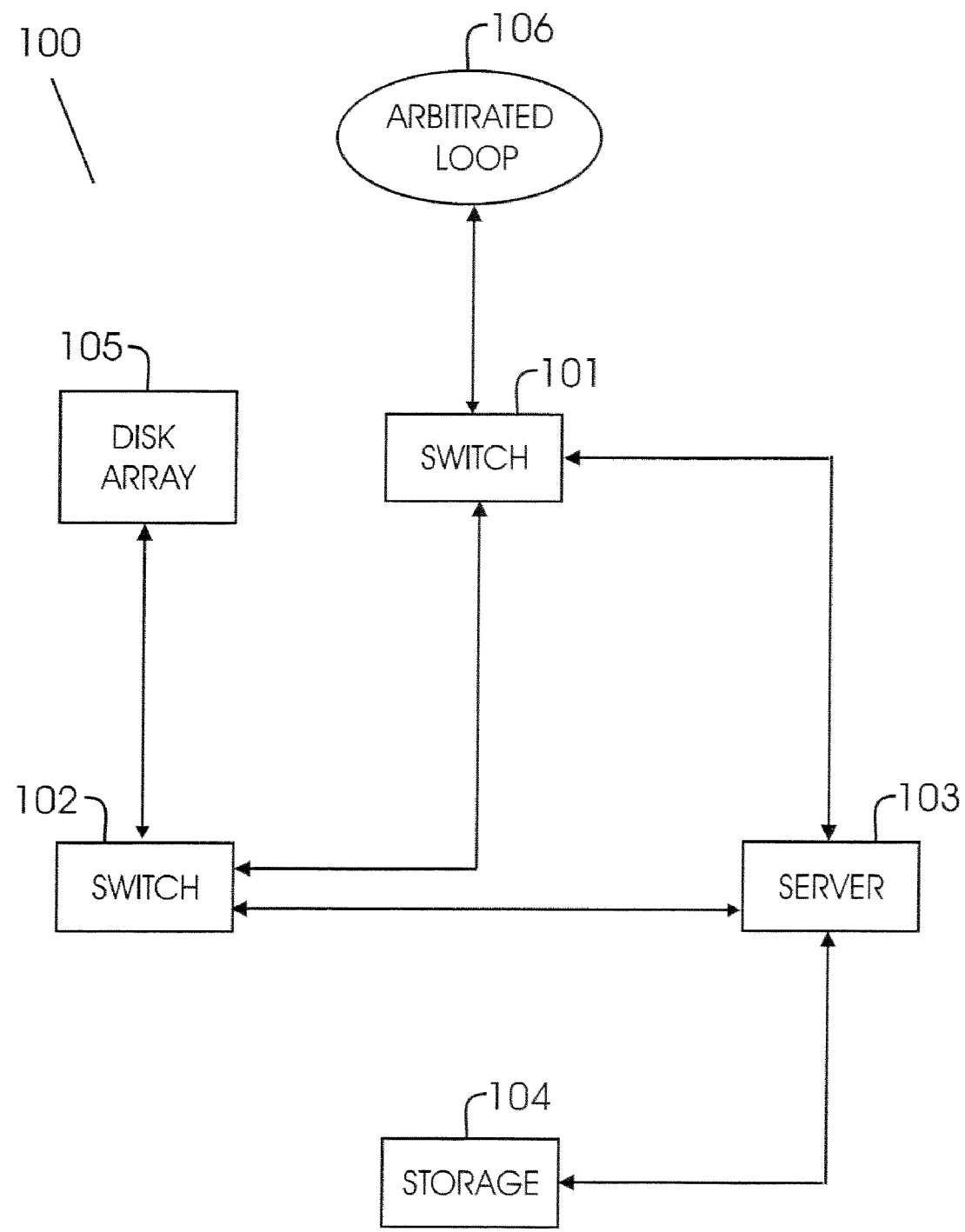
FIG. 1E shows a block diagram of an overall Fibre channel system that can use one aspect of the present invention.

FIG. 1E is a block diagram of a Fibre Channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104.

Fabric ports are located in fabric devices such as switch 101 and 102. Arbitrated loop 106 may be operationally coupled to switch 101 using arbitrated loop ports (FL_Ports).

The devices of FIG. 1E are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Switch Element

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking Fibre Channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL_Ports correspond to channel C0-C19. Each GL_Port has a serial/deserializer (SE DES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing Fibre optic input/output connections, as is well known in the high performance switch design. The converters connect to switch channels C0-C19. It is noteworthy that the ports can connect through copper paths or other means instead of optical-electric converters.

FIG. 1D shows a block diagram of ASIC 20 with sixteen GL ports and four 10 G (Gigabyte) port control modules designated as XG0-XG3 for four 10 G ports designated as XGP0-XGP3. ASIC 20 include a control port 62A that is coupled to IOP 66 through a PCI connection 66A.

Figure 2A:
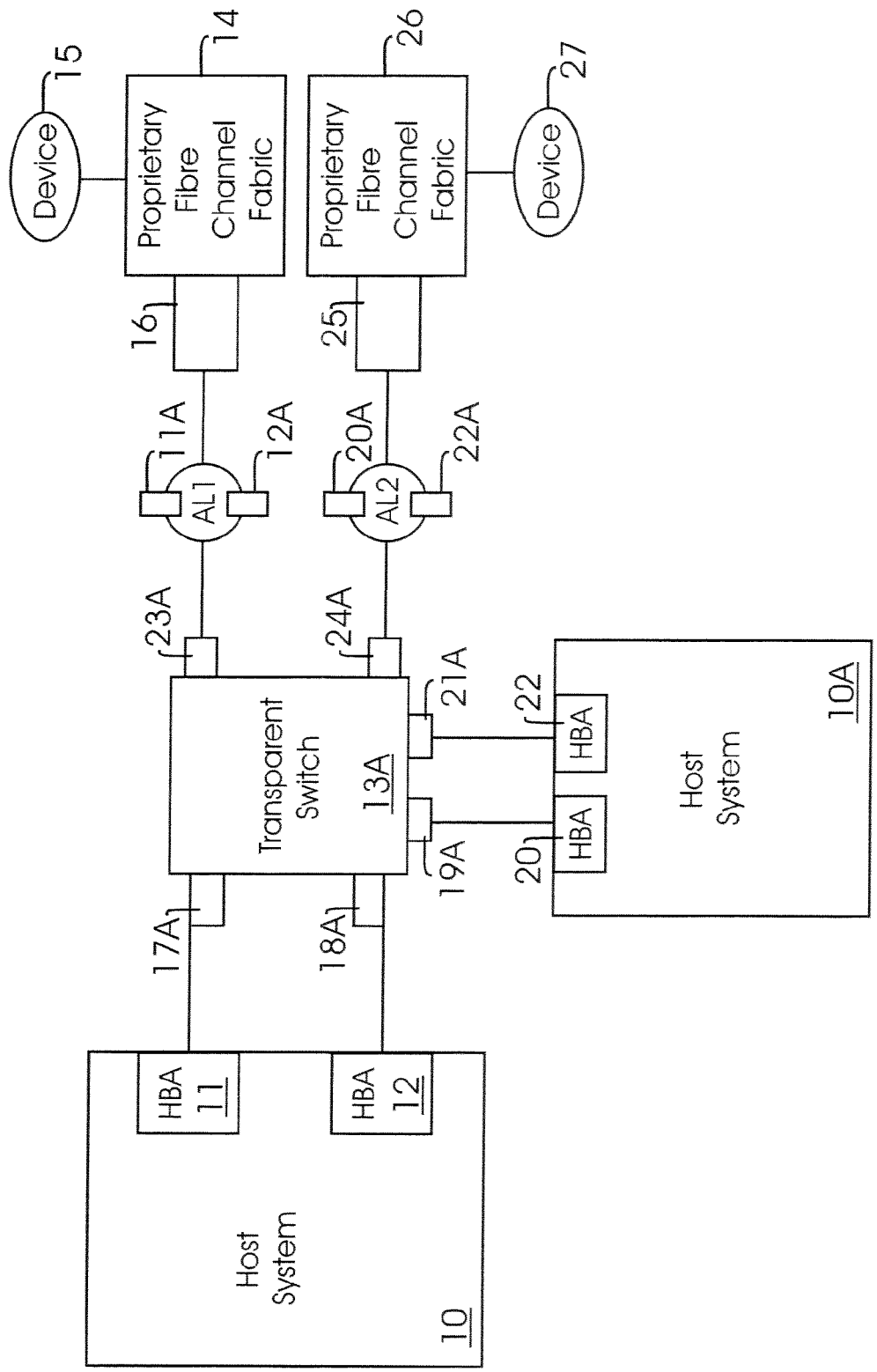
FIGS. 2A, 2C and 2D show block diagrams of various topologies using a transparent switch, according to one aspect of the present invention.

Loop Based Fabric Interface:

FIG. 2A shows a top-level block diagram using a transparent switch 13A, according to one aspect of the present invention. Transparent switch 13A (may also be referred to as "switch 13A") may be implemented using ASIC switch element 20 in chassis S2. Transparent switch 13A is coupled to HBA 11 via port 17A and HBA 12 via port 18A. Switch 13A is also coupled to HBA 20 via port 19A and HBA 22 via port 21A. Ports 17A, 18A, 19A and 21A are designated as TH_Ports (Transparent host ports), while ports 23A and 24A are designated as transparent fabric ports (TF_Ports or TFL_Ports (used interchangeably throughout this specification) (for loop functionality). Virtualized ALPAs for each HBA is shown as 11A, 12A, 20A and 22A, respectively.

Proprietary Fibre Channel fabric 14 communicates with ports 23A and 24A that function as NL_Ports. Proprietary switch 14 (or 26) believes that it is communicating with a host system directly and hence, there is no loss of functionality. It is noteworthy that although TH_Ports are shown as being linked with host systems, these ports may also be linked to storage devices.

Figure 2B:
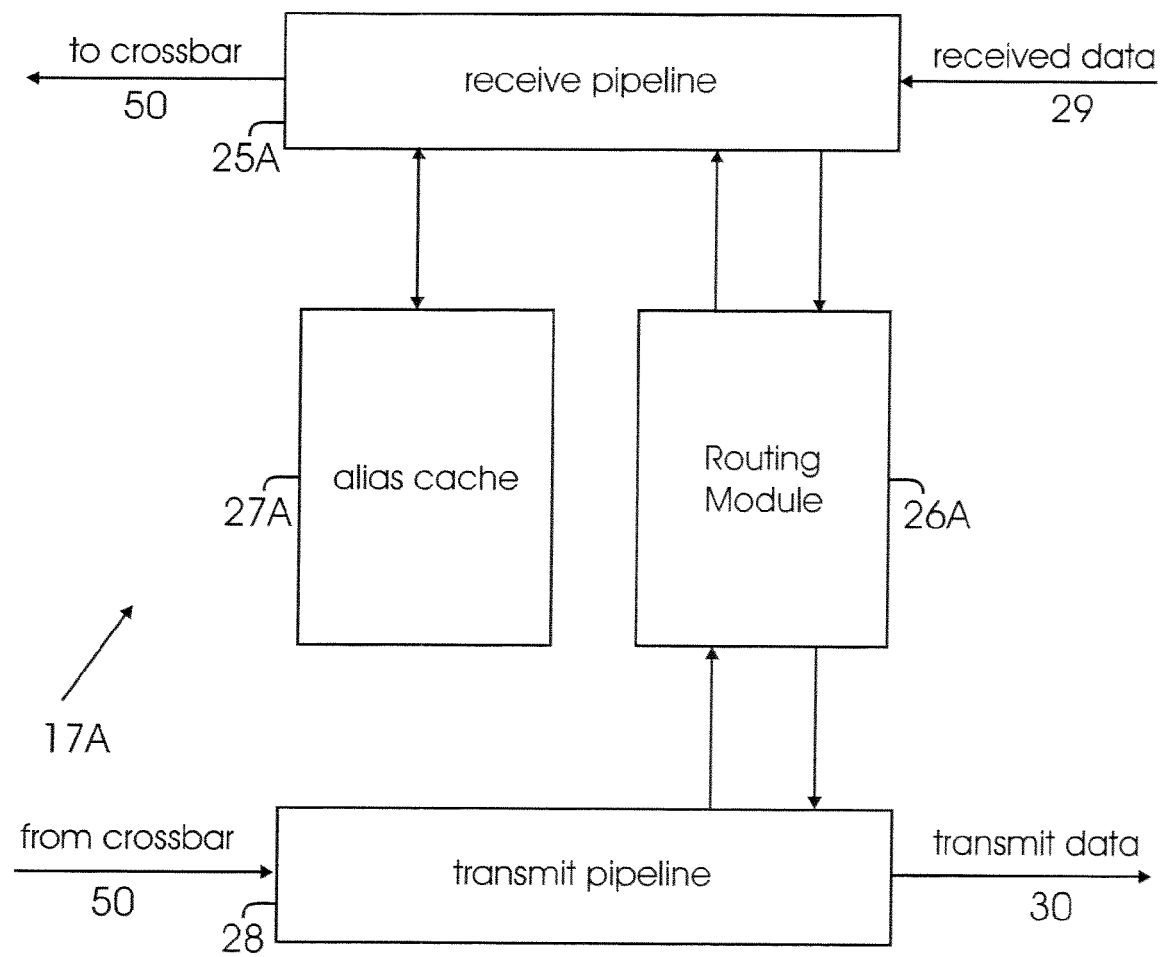
FIG. 2B shows a block diagram of a port in a transparent switch, according to one aspect of the present invention.

FIG. 2B shows an example of a port (for example, 17A), according to one aspect of the present invention. Port 17A includes a receive pipeline 25A that receives Fibre Channel frames/data 29. Received data 29 is processed and then via crossbar 50 moves to the transmit pipeline 28. The transmit pipeline 28 transmits data 30 to the destination. Details of the pipelines and how frames are transmitted using alias cache 27A are provided in the patent application Ser. No. 10/894,546, filed on Jul. 20, 2004, the disclosure of which is incorporated herein by reference in its entirety. Alias cache 27A is used to facilitate communication between a host and a device.

Figure 3:
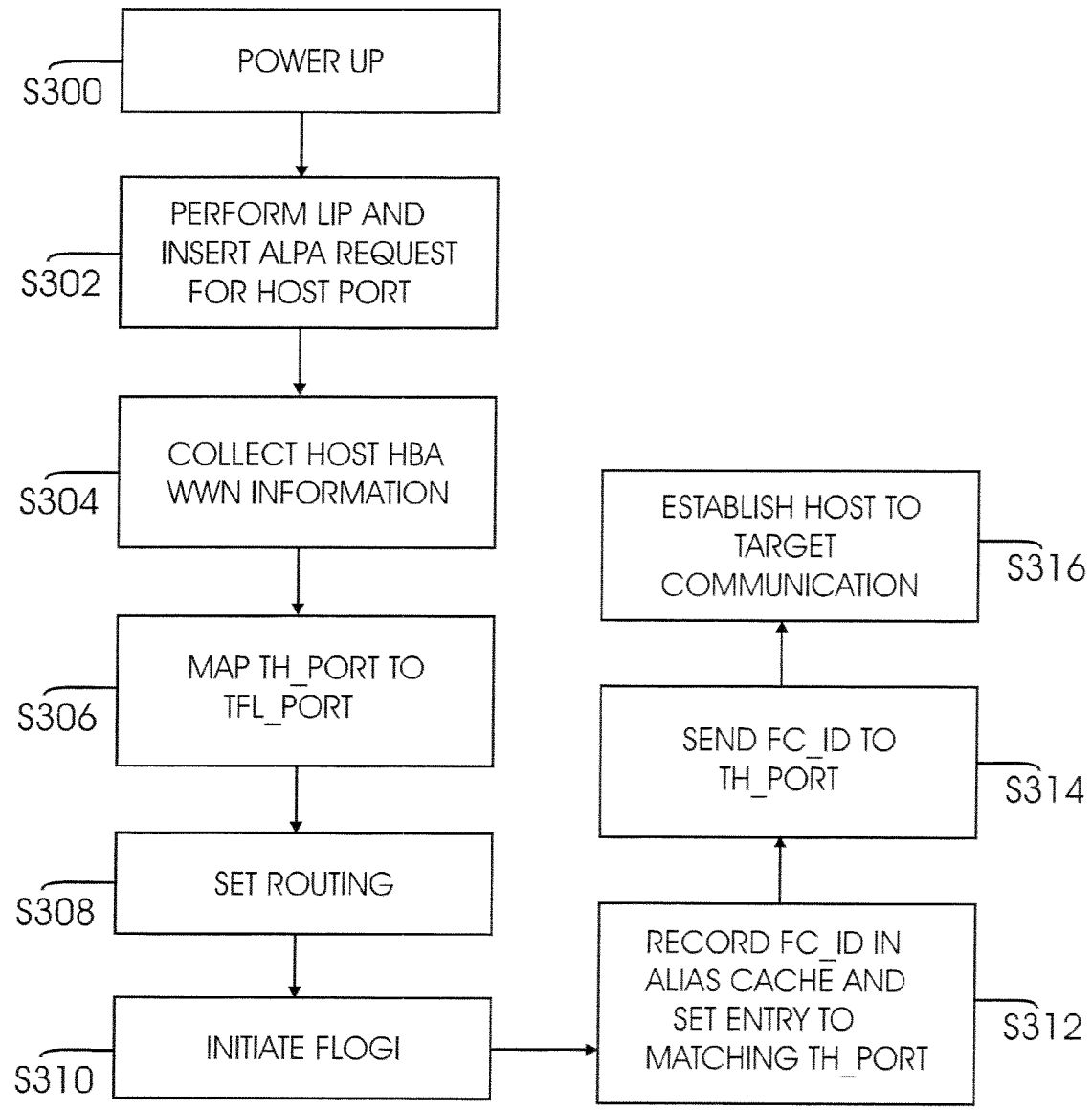
FIGS. 3, 4 and 5 shows process flow diagrams of using the transparent switch, according to one aspect of the present invention.

FIG. 3 shows a flow diagram of process steps that allow communication between a host system and a device behind a proprietary Fibre Channel fabric.

Transparent switch 13A acts as a proxy/bridge for attached host systems 10 and 10A. The fabric side ports (TFL_Ports) operate in a NL_Port link state mode. Each TFL_Port reserves ALPAS for all HBAs (11, 12, 20 and 22). Switch 13A FLOGIs on behalf of host system 10 and 10A across the TFL_Ports. FC_IDs are assigned by the TFL_Ports and stored in alias cache 27A and are used for communication between the hosts and target devices.

Turning in detail to FIG. 3, in step S300, transparent switch 13A is powered up. In step S302, the fabric side (i.e., ports 23A and 24A) is brought up through loop initialization (Fibre Channel standard process). Switch 13A does not perform FLOGI (standard log-in procedure) during this step. Switch 13A inserts an ALPA request for every host port that it can service, shown as 11A, 12A, 20A and 22A in FIG. 2A.

In step S304, switch 13A collects each supported HBA's unique worldwide number ("WWN"), which is provided by the HBA manufacturer. Switch 13A collects the WWN information during FLOGI by the TH_Ports (i.e., 17A, 18A, 19A and 21A) HBAs send an ACC (accept) response to the TH_Ports with the WWN number.

In step S306, switch 13A maps the TH_Ports to the TFL_Ports (i.e., 23A and/or 24A) In step S308, the mapping information is set in routing module 26A so that each TH_Port points to the matching TFL_Port. Routing module 26A is similar to the steering state machine described in the aforementioned patent application.

In step S310, switch 13A initiates a FLOGI across the TFL_Ports on behalf of the host. In step S312, the TFL_Ports record the FC_ID from the ACC response into alias cache 27A and then sets an entry to point to the matching TH_Port.

In step S314, FLOGI is performed across TH_Ports. Switch 13A responds to the TH_Ports with the FC_ID acquired in step S310. At this point switch 13A becomes transparent.

In step S316, host (for example, 10) to target (for example, device 15) communication is established. Host N_Ports' PLOGI to the Name Server pass straight through to the TFL_Ports and then via the proprietary fabrics (14 and/or 15) to the devices (for example, 15 and/or 27).

If a TF_Port goes down, then the matching TH_ports are also brought down. The TH_ports are then re-assigned to the remaining TF_Ports and the routing module 26A is adjusted based on the new assignment. For example, if TFL_Port 23A assigned to TH_Port 7A goes down, then TH_port 17A may be reassigned to port 24A.

If a TH_Port goes down then the corresponding TF_Port performs a loop initialization ("LIP") to remove any matching ALPA. The remaining TH_Ports wait until the TF_Port completes the LIP process.

Virtual N Port ID Fabric Side Interface:

Virtual N_Port_ID ("VNPID") is defined by the FC_FS standard, incorporated herein by reference in its entirety. VNPID provides link level capability multiple N_Port identifiers (Fibre Channel addresses) to a N_Port device. Typically, this is accomplished after FLOGI when the N_Port device sends a FDISC command with a new WWPN (World Wide Port Number) and the S_ID is set to 0. The switch responds with a new N_Port_ID having the same Domian/Area values but a different Port_ID value (which is the ALPA field for all NL_Ports).

Figure 2C:
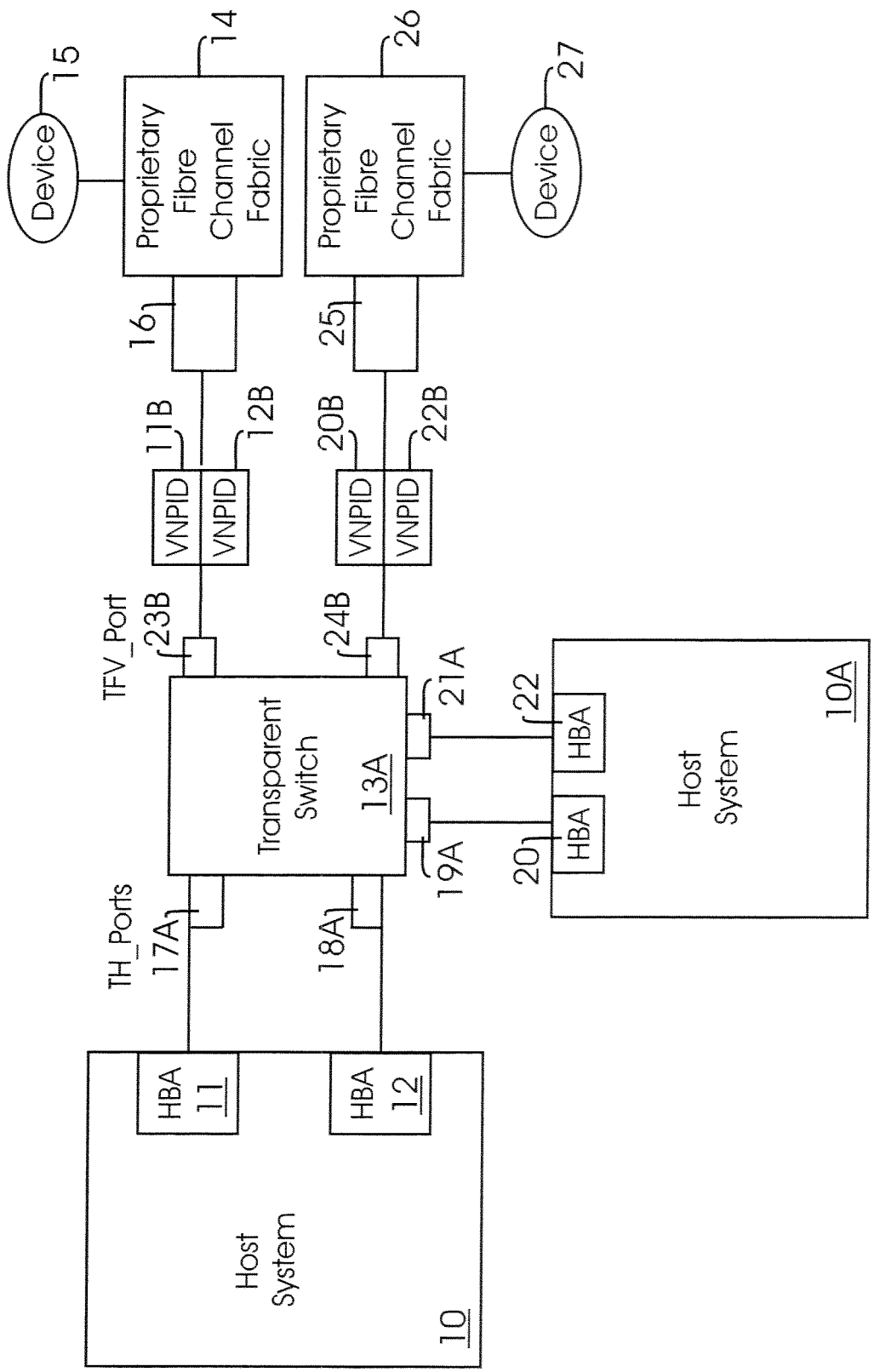

In one aspect of the present invention, TH_Ports and TFV_ports are defined by switch 13A. TFV_ports are shown in FIG. 2C as 23B and 24B. VNPIDS from HBAs 11, 12, 20 and 22 are shown as 11B, 12B, 20B and 22B, respectively. Switch 13A acts as a proxy/bridge for hosts 10 and 10A. TFV_ports request the VNPIDs from hosts 10 and 10A and then place the VNPIDs in alias cache 27A. The values are then used to route frames.

Figure 4:
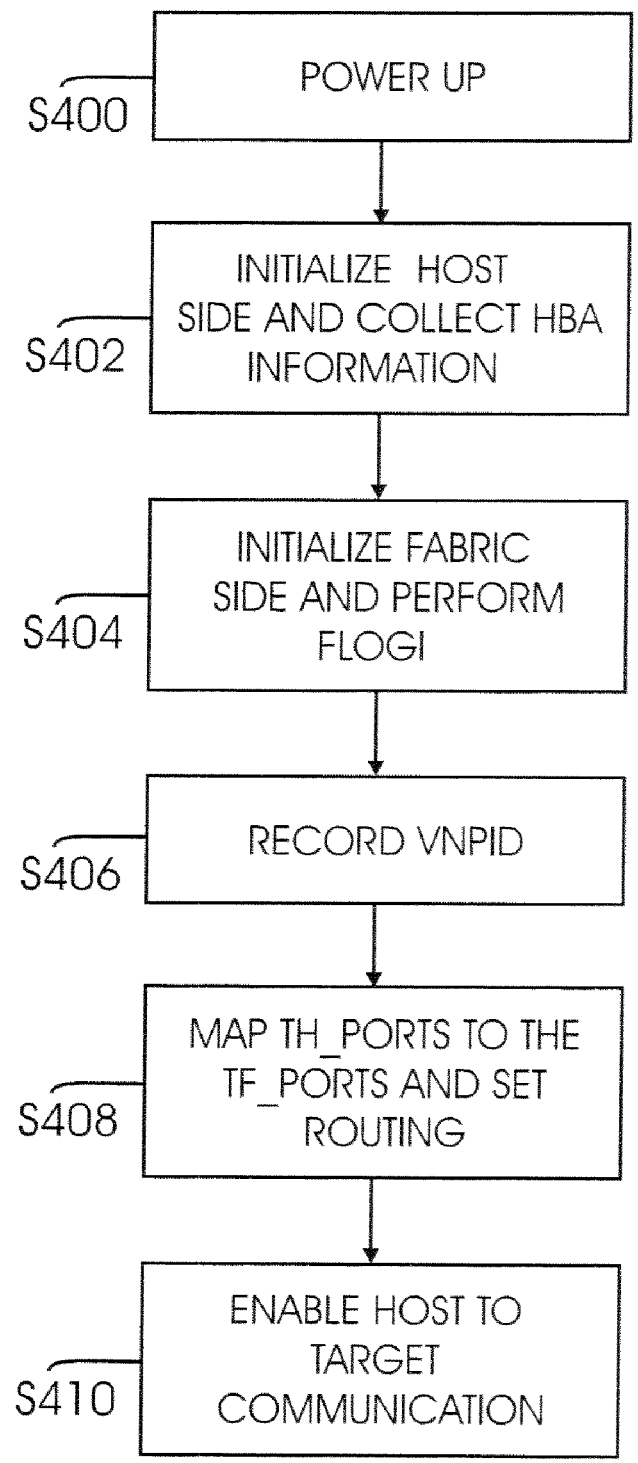

FIG. 4 shows a flow diagram of process steps for using VNPIDs, according to one aspect of the present invention. Turning in detail to FIG. 4, in step S400, switch 13A is powered up. In step S402, TH_Ports are initialized and switch 13A collects WWN information for HBAs 11, 12, 20 and 22. This is acquired during the FLOGI process. After the WWN information is collected, the TH_Ports are taken down (or disabled).

In step S404, switch 13A initializes the TFV_ports as if switch 13A was a host system. TFV_Ports send a FLOGI request to the fabric (i.e. 14 and 15) and then sends FDISC command with the WWPN information for each HBA. This includes a virtual N_Port identifier ("VNPID").

In step S406, TFV_Ports record a new VNPID in alias cache 27A. Each entry is set to a matching TH_port, i.e., each VNPID has a corresponding TH_Port entry.

In step S408, switch 13A maps each of the TH_port to a TFV_Port (for example, port 17A may be mapped to port 23B). Routing module 26A is set so that each TH_port points to a matching TFV_Port.

In step S410, the TH_Ports are re-initialized and the switch responds to the original FLOGI (step S402) with a reserved VNPID that can be allocated. The host PLOGI the Name Server and switch 13A initiates a PLOGI to the fabric switch (14 and/or 26). Switch 13A proxies the Name Server query commands between a TH_port and TFV_port. The change in HBA configuration is registered with switch 13A. Thereafter, host to device communication is enabled.

If a TFV_Port goes down during communication or otherwise, then a matching TH_port is brought down. The TH_Ports are re-assigned to other TFV_Ports and the routing scheme is adjusted accordingly. Based on the re-assignment a new VNPID is assigned to the TH_Ports.

If a TH_Port goes down then the corresponding TFV_port sends a FLOGI for a matching VNPID.

In one aspect of the present invention, Virtual Port ID may be used for allowing communication between hosts and targets and vice versa in a proprietary fabric switch environment.

RAID Expansion:

Redundant array of inexpensive disks ("RAID") configuration can also use the transparent switch 13A, according to one aspect of the present invention. In this configuration a storage controller (or a RAID controller's) target ports are mapped to one or more of fabric side ports. The fabric side port represents an alias of the target ports. Switch 13A multiplexes traffic to the appropriate port by using alias cache entries.

Figure 2D:
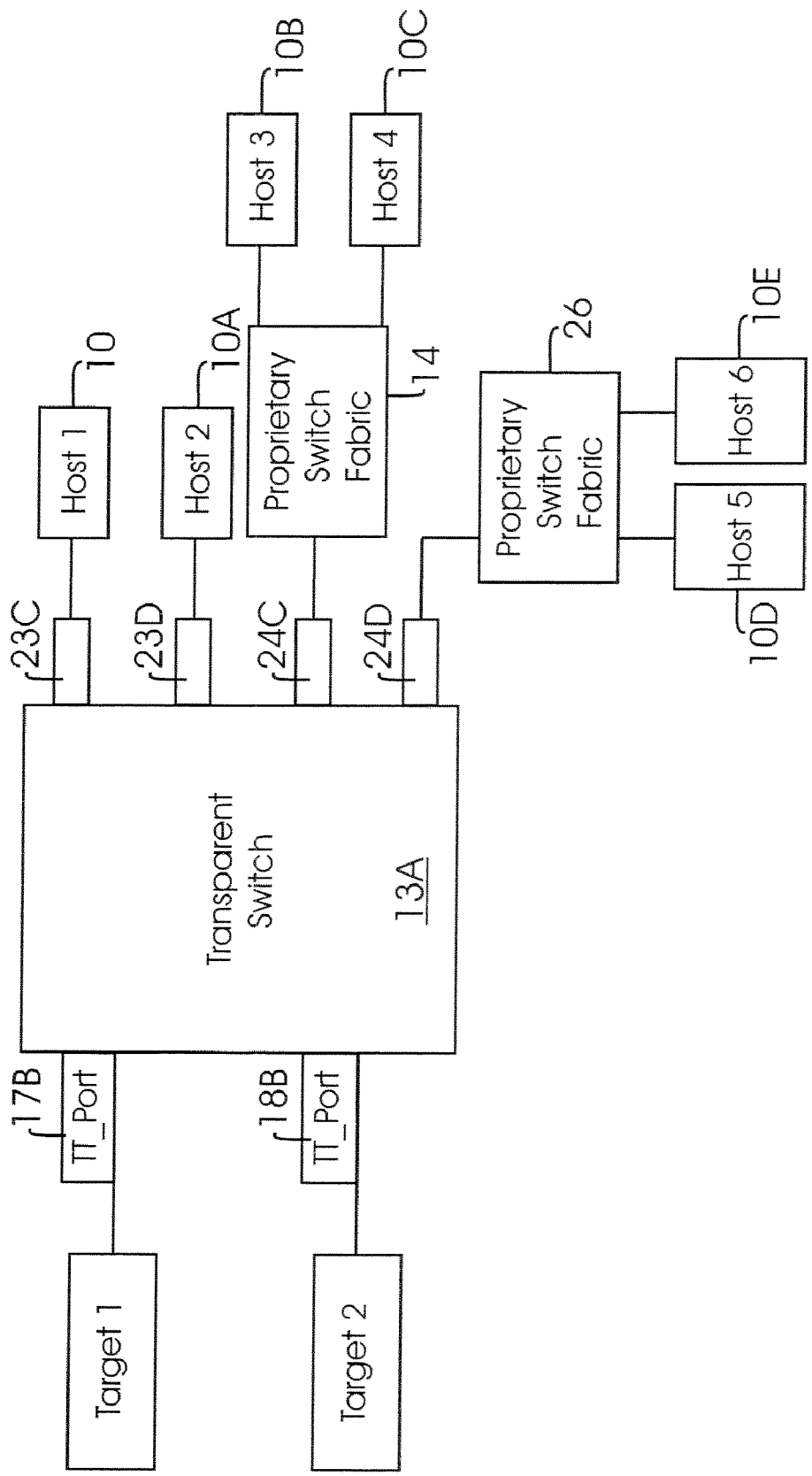

Two novel ports are defined for this configuration, a TT_Port and a TFT_port, according to one aspect of the present invention. In FIG. 2D TT_Ports are shown as 17B and 18B and TFT_Ports are shown as 23C, 23D, 24C and 24D.

Hosts 10 and 10A are coupled to TFT_Ports 23C and 23D respectively. Proprietary fabric switches 14 and 26 are coupled to ports 24C and 24D, respectively. Also, hosts' 10B and 10C are coupled to proprietary switch fabric 14; and hosts 10D and 10E are coupled to proprietary switch fabric 26.

Figure 5:
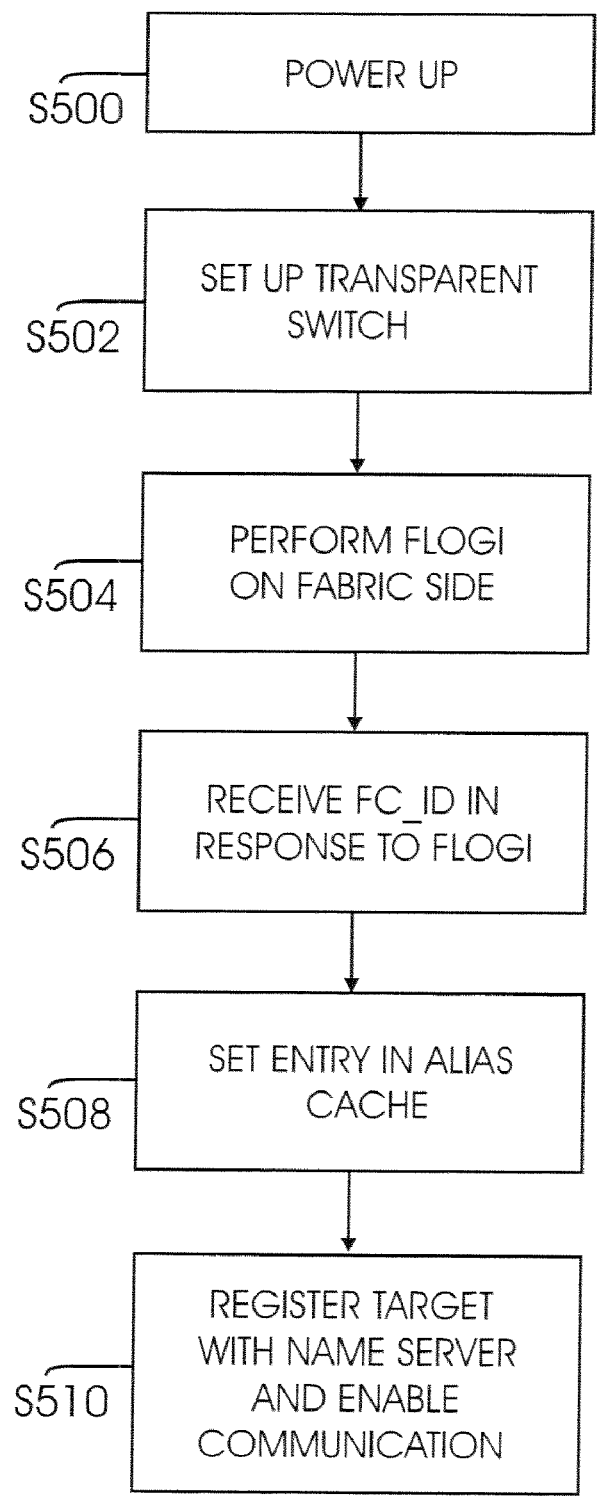

FIG. 5 shows a flow diagram for using transparent switch 13A. In step S500, switch 13A is powered up. In step S502, switch 13A is set up with a defined world wide name ("WWN"). Switch 13A also assigns target ports to the fabric side port and obtains host side WWPN information.

In step S504, switch 13A performs FLOGI on the TFT_Port side. Switch 13A uses the WWPN information to perform the FLOGI. In step S506, switch 13A receives FC_ID in response to the FLOGI.

In step S508, switch 13A sets an entry in alias cache 27A based on the FLOGI information. The FC_ID is matched to the D_ID to point to a corresponding TT_Port. Switch 13A adds an entry in the alias cache 27A of the TT_port to match the new FC_ID in the S_ID. This entry routes frames from TT_Port to the TFT_Port.

In step S510, target 1 and 2 are registered with the Name Server and communication is enabled.

It is noteworthy that the TT_Ports may be addressed by multiple FC_IDs and maintains distinct exchanges for the multiple FC_IDs.

In one aspect of the present invention, a transparent switch allows communication with proprietary switches without loss of functionality.

Although the present invention has been described with reference to specific embodiments, these embodiments are illustrative only and not limiting. Many other applications and embodiments of the present invention will be apparent in light of this disclosure and the following claims.

What is claimed is:

1. A method for communication between a host system operationally coupled to a transparent host port of a Fibre Channel switch element and a target device that is operationally coupled to a proprietary switch fabric, comprising:
collecting world wide port number ("WWPN") information regarding a host bus adapter for the host system and disabling the transparent host port after the WWPN information is collected;
initiating a fabric login (FLOGI) process after the transparent host port is disabled, wherein the Fibre Channel switch element initiates the FLOGI process on behalf of the host system and a transparent fabric port of the Fibre Channel switch element records a virtual N_Port identifier; and
mapping a transparent fabric port of the Fibre Channel switch element to a transparent host port of the Fibre Channel switch element such that the host system communicates with the target device while the Fibre Channel switch element is transparent to the proprietary switch fabric.

2. The method of claim 1, wherein the transparent host port is reinitialized after the transparent fabric port is initialized and the Fibre Channel switch element responds to a FLOGI request with a reserved virtual N_Port identifier and initiates an N_Port to N_Port login (PLOGI) procedure with the proprietary switch fabric.

3. The method of claim 1, wherein the Fibre Channel switch element proxies name server commands between the transparent host port and the transparent fabric port.

4. A method of communication between a host system operationally coupled to a host port of a switch element and a target device that is operationally coupled to a fabric port of the switch element via a proprietary switch fabric, comprising:
collecting unique identification information of an adapter for the host system after the host port is initialized;
disabling the host port after collecting the identification information;
after disabling the host port; initializing a fabric port that operationally couples the switch element to the proprietary switch fabric, and the fabric port records a virtual N_Port identifier; and
logging into the proprietary switch fabric; wherein the switch element initiates the login process on behalf of the host system; and the host system communicates with proprietary switch fabric in a network environment with both the proprietary switch fabric and the switch element, and the switch element is transparent to the proprietary switch fabric.

5. The method of claim 4, wherein the switch element is a Fibre Channel switch element.

6. The method of claim 4, wherein the unique identification information is a worldwide port number (WWPN).

7. The method of claim 4, wherein the switch element proxies name server commands between the host port and the fabric port.

8. A switch element for communication between a host system and a target device, the host system operationally coupled to the switch element and the target device operationally coupled to a proprietary switch fabric, comprising:
a fabric port that communicates with the target device through the proprietary switch fabric by logging on behalf of the host system such that the proprietary switch operates as if it was communicating directly with the host system; and
a host port that communicates with the host system via an adapter such that when the host system communicates with the target device, the switch element is transparent to the proprietary switch fabric; wherein after the switch element is powered up, the host port is initialized and the switch element collects identifier information for the adapter during a login process; and after the identifier information is collected, the host port is disabled and the fabric port is initialized; and
wherein the fabric port sends a login request to the proprietary switch fabric as if the switch element was the host system; and the fabric port stores virtual port identifier information for routing frames.

9. The switch element of claim 8, wherein the fabric port sends a world wide port number (WWPN) with a virtual port identifier to the proprietary switch fabric after sending a login request.

10. The switch element of claim 8, wherein the switch element proxies name server commands between the host port and the fabric port.

11. The switch element of claim 8, wherein the host port is reinitialized after the fabric port is initialized and the switch element responds to the login request with a reserved virtual port identifier and initiates a login procedure with the proprietary switch fabric.

12. The switch element of claim 8, wherein the switch element is a Fibre Channel switch element.

13. The switch element of claim 8, wherein the unique identification information is a worldwide port number (WWPN).

* * * * *

UNITED STATES PATENT AND TRADEMARK OFFICE
CERTIFICATE OF CORRECTION

PATENT NO. : 7,542,676 B2
APPLICATION NO. : 12/031585
DATED : June 2, 2009
INVENTOR(S) : Edward C. McGlaughlin It is certified that error appears in the above-identified patent and that said Letters Patent is hereby corrected as shown below:

In column 3, line 11, delete "Invention," and insert -- invention, --, therefor.

In column 4, line 59, delete "FLOGI" and insert -- PLOGI --, therefor.

In column 7, line 62, delete "7A" and insert -- 17A --, therefor.

Signed and Sealed this

Twenty-sixth Day of October, 2010

David J. Kappos
*Director of the United States Patent and Trademark Office*